United States Patent
Fujii et al.

(10) Patent No.: US 10,062,472 B2
(45) Date of Patent: Aug. 28, 2018

(54) POLYOLEFIN MOLDED PRODUCT

(71) Applicant: IDEMITSU KOSAN CO., LTD., Chiyoda-ku (JP)

(72) Inventors: Nozomu Fujii, Ichihara (JP); Masahiro Kubo, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 211 days.

(21) Appl. No.: 14/437,288

(22) PCT Filed: Oct. 25, 2013

(86) PCT No.: PCT/JP2013/079034
§ 371 (c)(1),
(2) Date: Apr. 21, 2015

(87) PCT Pub. No.: WO2014/065416
PCT Pub. Date: May 1, 2014

(65) Prior Publication Data
US 2015/0274949 A1 Oct. 1, 2015

(30) Foreign Application Priority Data
Oct. 25, 2012 (JP) ................................. 2012-235840

(51) Int. Cl.
| | |
|---|---|
| H01B 1/20 | (2006.01) |
| C08F 110/06 | (2006.01) |
| C08K 3/14 | (2006.01) |
| C08K 3/16 | (2006.01) |
| C08L 23/12 | (2006.01) |
| C08J 5/18 | (2006.01) |
| C08L 23/02 | (2006.01) |
| C09K 3/14 | (2006.01) |
| C09K 3/16 | (2006.01) |
| C08K 5/103 | (2006.01) |

(52) U.S. Cl.
CPC ............. *H01B 1/20* (2013.01); *C08F 110/06* (2013.01); *C08J 5/18* (2013.01); *C08L 23/02* (2013.01); *C08L 23/12* (2013.01); *C09K 3/149* (2013.01); *C09K 3/16* (2013.01); *C08F 2500/03* (2013.01); *C08F 2500/15* (2013.01); *C08K 5/103* (2013.01)

(58) Field of Classification Search
CPC ... H01B 1/20; H01B 1/22; H01B 1/24; C09K 3/16; C09K 3/14; C09K 3/149; C08J 5/18; C08L 23/02; C08L 23/10; C08L 23/12; C08L 23/14; C08L 23/142; C08L 23/145; C08L 23/147; C08L 2666/86; C08F 110/06; C08F 2500/03; C08F 2500/15
See application file for complete search history.

(56) References Cited

U.S. PATENT DOCUMENTS

| | | | | |
|---|---|---|---|---|
| 6,071,598 A | * | 6/2000 | Peiffer | B32B 27/32 428/515 |
| 6,770,355 B1 | * | 8/2004 | Minami | B29D 7/01 428/220 |
| 6,913,834 B2 | * | 7/2005 | Kanamaru | B32B 27/32 428/515 |
| 7,250,211 B1 | | 7/2007 | Minami et al. | |
| 7,253,234 B2 | * | 8/2007 | Mori | C08L 23/12 525/240 |
| 7,619,038 B2 | * | 11/2009 | Mehta | C08L 23/10 524/515 |
| 2010/0190405 A1 | | 7/2010 | Takebe et al. | |
| 2012/0302982 A1 | * | 11/2012 | Takebe | D04H 3/16 604/372 |
| 2013/0309931 A1 | * | 11/2013 | Koori | D04H 3/147 442/401 |
| 2013/0323995 A1 | * | 12/2013 | Koori | D04H 1/4291 442/364 |

FOREIGN PATENT DOCUMENTS

| | | | | |
|---|---|---|---|---|
| CN | 1384848 A | 12/2002 | | |
| CN | 1384849 A | 12/2002 | | |
| CN | 101688341 A | 3/2010 | | |
| JP | 48 32938 | 5/1973 | | |
| JP | 56 2333 | 1/1981 | | |
| JP | 11 123759 | 5/1999 | | |
| JP | 2008 231266 | 10/2008 | | |
| JP | WO 2011090132 A1 | * | 7/2011 | ............. D04H 3/007 |
| WO | 2009 001871 | 12/2008 | | |
| WO | 2012 105566 | 8/2012 | | |
| WO | 2012 105567 | 8/2012 | | |

OTHER PUBLICATIONS

Combined Chinese Office Action and Search Report dated May 5, 2016 in Patent Application No. 201380055796.4 (with English translation of categories of cited documents).
International Search Report dated Nov. 19, 2013 in PCT/JP13/079034 Filed Oct. 25, 2013.

* cited by examiner

*Primary Examiner* — Harold Pyon
*Assistant Examiner* — Matthew R Diaz
(74) *Attorney, Agent, or Firm* — Oblon, McClelland, Maier & Neustadt, L.L.P.

(57) ABSTRACT

A polyolefin molded product comprising a resin composition containing (1) from 1 to 30% by mass of an olefin-based polymer having an elastic modulus of from 5 to 450 MPa, (2) a propylene-based polymer having an elastic modulus of 500 MPa or more (the content of the component (2) is the balance), and (3) from 0.0001 to 2% by mass of an additive.

8 Claims, No Drawings

POLYOLEFIN MOLDED PRODUCT

TECHNICAL FIELD

The present invention relates to a polyolefin molded product.

BACKGROUND ART

Molded products such as films, sheets, and injection-molded products almost contain, as incorporated therein, some additive capable of bleeding on their surfaces to exhibit the effect thereof. In general, additives may readily bleed out at high temperature and high humidity, and therefore, the type and the amount of the additive to be incorporated must be changed on a case-by-case basis, depending on the environments where the molded products are to be put.

As a solution to the problem, for example, PTL 1 and 2 describe a method of controlling additive bleed-out according to a combination and a formation of specific additives.

CITATION LIST

Patent Literature

PTL 1: JP-A 48-32938
PTL 2: JP-A 56-2333

SUMMARY OF INVENTION

Technical Problem

The method described in PTLs 1 and 2 could be effective for reducing the environmental dependence of additive bleed-out, but is applicable to only the combination and the formulation of specific additives and therefore lacks versatility.

An object of the present invention is to provide a polyolefin molded product having little environmental dependence of additive bleed-out.

Solution to Problems

The present invention relates to a polyolefin molded product of the following [1] to [6].

[1] A polyolefin molded product comprising (1) from 1 to 30% by mass of an olefin-based polymer having an elastic modulus of from 5 to 450 MPa, (2) a propylene-based polymer having an elastic modulus of 500 MPa or more (the content of the component (2) is the balance), and (3) from 0.0001 to 2% by mass of an additive.

[2] The polyolefin molded product described in the above [1], wherein the ratio of the following physical property (a) to the following physical property (b) ((a)/(b)) is from 0.75 to 1.35:
(a) Additive-derived physical property of the molded product stored for 7 days just after the molding thereof in an environment at a temperature of 23° C. and a humidity of 50%,
(b) Additive-derived physical property of the molded product stored for 7 days just after the molding thereof in an environment at a temperature of 40° C. and a humidity of 90%.

[3] The polyolefin molded product described in the above [1] or [2], wherein the additive is at least one selected from an antistatic agent, a release agent, an electric properties improver, a light stabilizer, a UV stabilizer, a slip agent, an antiblocking agent, an antifogging agent and an anti-adhesive agent.

[4] The polyolefin molded product described in any of the above [1] to [3], wherein the additive is an antistatic agent and the additive-derived physical property is a surface resistivity.

[5] The polyolefin molded product described in any of the above [1] to [4], wherein the olefin-based polymer (1) satisfies the following characteristics (a) to (g):
(a) [mmmm]=20 to 60 mol %,
(b) [rrrr]/(1−[mmmm])≤0.1,
(c) [rmrm]>2.5 mol %,
(d) [mm]×[rr]/[mr]≤2.0,
(e) Weight-average molecular weight (Mw)=10,000 to 500,000,
(f) Molecular weight distribution (Mw/Mn)<4,
(g) The melting point (Tm–D) defined as the peak top of the peak appearing on the highest temperature side of the melt endothermic curve drawn by keeping the polymer in a nitrogen atmosphere at −10° C. for 5 minutes and then heating it at 10° C./min, using a differential scanning calorimeter (DSC), is from 0 to 120° C.

[6] The polyolefin molded product described in any of the above [1] to [5], which is a sheet or a film.

Advantageous Effects of Invention

The polyolefin molded product of the present invention has little environmental dependence of additive bleed-out. Accordingly, there is no need of consideration of any influence of bleed-out that may vary depending on the temperature and humidity environments where the molded product is put, and the formulation of additives in production of the molded product can be kept constant.

DESCRIPTION OF EMBODIMENTS

The polyolefin molded product of the present invention comprises a resin composition containing (1) from 1 to 30% by mass of an olefin-based polymer having an elastic modulus of from 5 to 450 MPa, (2) a propylene-based polymer having an elastic modulus of 500 MPa or more (the content of the component (2) is the balance), and (3) from 0.0001 to 2% by mass of an additive.

Though all the details thereof are not as yet clarified, the mechanism of expressing the effects of the present invention could be presumed as follows.

Additives may exist in the amorphous part of resin. In the case where the substrate resin is polypropylene having a high degree of crystallinity (general-purpose polypropylene having an elastic modulus of 500 MPa or more) and where the environment in which molded products are put is at a high temperature, then secondary crystallization will go on and the amorphous part in the products may reduce. On the other hand, where the environment in which molded products are put is at a high humidity, additives having a high affinity to moisture may more easily move to the surface. As a result, it is considered that the additives having existed in the amorphous part would be extruded out to bleed-out on the surface of the molded products.

In the present invention, it is considered that, by incorporating a predetermined amount of an olefin-based polymer having an elastic modulus of from 5 to 450 MPa and having a low degree of crystallinity in such general-purpose polypropylene, the amorphous part in the resin composition could be increased. In addition, it is also considered that, in the olefin-based polymer, the amorphous part would change little even at an elevated temperature, and as a result, it is considered that the additive would hardly be extruded out even at an elevated temperature and the environmental dependence of additive bleed-out could be thereby reduced.

In general, it is considered that, when the low-crystalline component is increased, then bleed-out would only increase. Accordingly, the effect of the present invention can be said to be an unexpected effect.

The mechanism of action of expressing the effect of the present invention is not limited to the presumed mechanism mentioned above.

The components contained in the resin composition constituting the molded product of the present invention are described below.

(1) Olefin-Based Polymer Having Elastic Modulus of from 5 to 450 MPa

In the present invention, as a low-crystalline component for controlling additive bleeding, used is an olefin-based polymer having an elastic modulus of from 5 to 450 MPa. The olefin-based polymer is a crystalline olefin-based polymer having a suitably-randomized stereoregularity. Hereinafter "olefin-based polymer having an elastic modulus of from 5 to 450 MPa" may be referred to as "low-crystalline olefin-based polymer".

An olefin-based polymer having an elastic modulus of less than 5 MPa is a completely amorphous component, and the polymer itself bleeds out. On the other hand, when the modulus is more than 450 MPa, the degree of crystallinity of the polymer is too high as a low-crystalline component, and the effect of reducing the environmental dependence of additive bleed-out would decrease. From these viewpoints, the elastic modulus of the low-crystalline olefin-based polymer (1) is from 5 MPa to 200 MPa, and is preferably 10 MPa or more, more preferably 20 MPa or more, even more preferably 30 MPa or more, and preferably 100 MPa or less, more preferably 70 MPa or less, even more preferably 60 MPa or less.

The low-crystalline olefin-based polymer (1) for use in the present invention is preferably an olefin-based polymer produced by polymerizing at least one monomer selected from ethylene and an α-olefin having from 3 to 28 carbon atoms.

The α-olefin having from 3 to 28 carbon atoms includes, for example, propylene, 1-butene, 1-pentene, 4-methyl-1-pentene, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, etc. Of those, preferred is an α-olefin having from 3 to 16 carbon atoms, more preferred is an α-olefin having from 3 to 10 carbon atoms, even more preferred is an α-olefin having from 3 to 6 carbon atoms, and especially preferred is propylene. One alone of those may be polymerized to give an olefin-based polymer for use herein, or two or more may be copolymerized together to give an olefin-based copolymer for use herein. In the present invention, mere expression of "olefin-based polymer" shall include an olefin-based copolymer.

As the olefin-based polymer, especially preferred is polypropylene. So far as the elastic modulus thereof is from 5 to 450 MPa, the polypropylene may be a copolymer with any other above-mentioned α-olefin than propylene. In this case, the blend ratio of the other α-olefin than propylene is preferably 2% by mass or less relative to the entire amount of propylene and the other α-olefin, more preferably 1% by mass or less.

One alone or a combination of two or more of low-crystalline olefin-based polymers (1) may be used here.

The low-crystalline olefin-based polymer (1) for use in the present invention is especially preferably a low-crystalline olefin-based polymer satisfying the following characteristics (a) to (g), more preferably a low-crystalline polypropylene satisfying the following characteristics (a) to (g):

(a) [mmmm]=20 to 60 mol %,
(b) [rrrr]/(1−[mmmm])≤0.1,
(c) [rmrm]>2.5 mol %,
(d) [mm]×[rr]/[mr]≤2.0,
(e) Weight-average molecular weight (Mw)=10,000 to 500,000,
(f) Molecular weight distribution (Mw/Mn)<4,
(g) The melting point (Tm−D) defined as the peak top of the peak appearing on the highest temperature side of the melt endothermic curve drawn by keeping the polymer in a nitrogen atmosphere at −10° C. for 5 minutes and then heating it at 10° C./min, using a differential scanning calorimeter (DSC), is from 0 to 120° C.

In the above, [mmmm] means a meso-pentad fraction, [rrrr] means a racemic-pentad fraction, [rmrm] means a racemic-meso-racemic-meso-pentad fraction, [mm] means a meso-triad fraction, [rr] means a racemic-triad fraction, [mr] means a meso-racemic-triad fraction, and each is a value calculated according to the method described in Examples.

The above-mentioned characteristics (a) to (g) are described in sequence hereinunder.

(a) [mmmm]=20 to 60 mol %

With respect to the low-crystalline polypropylene preferred for use in the present invention, [mmmm] (meso-pentad fraction) is preferably from 20 to 60 mol %. When [mmmm] is 20 mol % or more, solidification after melting would not be retarded and the resin composition can be prevented from being sticky, and therefore there would be no texture change before and after polymer addition. When [mmmm] is 60 mol % or less, then the degree of crystallinity of the polymer would not be too high, and a sufficient amount of the amorphous component necessary for control of the environmental dependence of bleed-out could exist in the composition. From these viewpoints, [mmmm] is preferably from 30 to 55 mol %, more preferably from 40 to 55 mol %.

(b) [rrrr]/(1−[mmmm])≤0.1

With respect to the low-crystalline polypropylene preferred for use in the present invention, [rrrr]/(1−[mmmm]) is preferably 0.1 or less. [rrrr]/(1−[mmmm]) is an index of indicating the uniformity of the regularity distribution of the low-crystalline polypropylene. Having a large value of the ratio, the polymer would be a mixture of a high-stereoregularity polypropylene and an atactic polypropylene, which is similar to polypropylene produced using a Ziegler catalyst, and may cause stickiness. From this viewpoint, [rm]/(1−[mmmm]) is preferably from 0.001 to 0.05, more preferably from 0.001 to 0.04, even more preferably from 0.01 to 0.04. [rrrr] and [mmmm] in the above-mentioned (b) each are not a value in mol % but are calculated as an ordinary ratio.

(c) [rmrm]>2.5 mol %

With respect to the low-crystalline polypropylene preferred for use in the present invention, [rmrm] is preferably more than 2.5 mol %. When [rmrm] is more than 2.5 mol %, then the low-crystalline polypropylene can keep the randomness thereof, and therefore, the degree of crystallinity increases owing to the crystallization of the isotactic polypropylene block chain and the polymer is not sticky, and there would be no texture change before and after polymer addition. From these viewpoints, [rmrm] is preferably 2.6 mol % or more, more preferably 2.7 mol % or more. In general, the upper limit is preferably 10 mol % or so, more preferably 7 mol %, even more preferably 5 mol %, still more preferably 4 mol %.

(d) $[mm] \times [rr]/[mr] \leq 2.0$

With respect to the low-crystalline polypropylene preferred for use in the present invention, $[mm] \times [rr]/[mr]^2$ is preferably 2.0 or less. $[mm] \times [rr]/[mr]^2$ indicates an index of randomness of the polymer. When the value is 2.0 or less, then the additive dispersibility may be good and the polymer is not sticky, and there would be no texture change before and after polymer addition. From these viewpoints, $[mm] \times [rr]/[mr]^2$ is preferably from more than 0.25 to 1.8, more preferably from 0.5 to 1.8, even more preferably from 1 to 1.8, still more preferably from 1.2 to 1.6.

(e) Weight-Average Molecular Weight (Mw)=10,000 to 500,000

With respect to the low-crystalline polypropylene preferred for use in the present invention, the weight-average molecular weight is from 10,000 to 500,000. When the weight-average molecular weight is 10,000 or more, the viscosity of the low-crystalline polypropylene is not too low and could be on a suitable level, and the mechanical properties of the polymer can be prevented from being worsened. On the other hand, when the weight-average molecular weight is 500,000 or less, then the viscosity of the low-crystalline polypropylene is not too high, and the moldability of the polymer can be prevented from being worsened. From these viewpoints, the weight-average molecular weight is preferably from 30,000 to 400,000, more preferably 40,000 to 340,000, even more preferably from 80,000 to 230,000, still more preferably from 100,000 to 230,000.

(f) Molecular Weight Distribution (Mw/Mn)<4

With respect to the low-crystalline polypropylene preferred for use in the present invention, the molecular weight distribution (Mw/Mn) is preferably less than 4. When the molecular weight distribution is less than 4, then the moldability of the polymer can be prevented from being worsened. The molecular weight distribution is preferably 3 or less, more preferably 2.5 or less, even more preferably from 1.5 to 2.5.

(g) Melting Point (Tm-D) is from 0 to 120° C.

With respect to the low-crystalline olefin-based polymer (1) preferred for use in the present invention, the melting point (Tm-D) is preferably from 0 to 120° C. from the viewpoint of additive bleed-out, more preferably from 20 to 120° C., even more preferably from 20 to 100° C., still more preferably from 40 to 100° C., further more preferably from 50 to 90° C., and especially preferably from 60 to 80° C.

In the present invention, using a differential scanning calorimeter (DSC-7 available from PerkinElmer, Inc.), 10 mg of a sample is kept in a nitrogen atmosphere at −10° C. for 5 minutes, and then heated at 10° C./min. The peak top of the peak appearing on the highest temperature side of the resultant melt endotherm curve is referred to as the melting point (Tm-D).

Further, with respect to the low-crystalline olefin-based polymer (1), the crystallization temperature (Tc) is preferably from 10 to 60° C., more preferably from 20 to 50° C., even more preferably from 30 to 40° C. Also preferably, the melt flow rate (MFR) of the polymer is from 20 to 400 g/10 min, more preferably from 20 to 200 g/10 min, even more preferably from 20 to 100 g/10 min, still more preferably from 40 to 80 g/10 min. The crystallization temperature and MFR are values measured according to the methods described in Examples.

Process of Producing Low Crystalline Olefin Polymer (1):

As the process of producing a low crystalline olefin polymer (1) used in the present invention, the α-olefin such as propylene is preferably polymerized or copolymerized by using a metallocene catalyst obtained by combining (A) a transition metal compound having a crosslinked structure through two crosslinking groups with (B) a promoter.

Specifically, the α-olefin such as propylene can be polymerized or copolymerized in the presence of a polymerization catalyst containing a transition metal compound (A) represented by the following general formula (i) and a promoter component (B) selected from a compound (B-1) capable of forming an ionic complex through reaction with a transition metal compound as the component (A) or a derivative thereof, and an aluminoxane (B-2).

(i)

In the general formula (i), M represents a metal element of the groups 3 to 10 or of lanthanoid series in the periodic table; $E^1$ and $E^2$ each represent a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group, and a silicon-containing group, forming a crosslinked structure through $A^1$ and $A^2$, and $E^1$ and $E^2$ may be the same or different from each other; X represents a σ-bonding ligand, and when plural "X"s exist, "X"s may be the same or different from each other and "X"s each may be crosslinked to another X, $E^1$, $E^2$, or Y. Y represents a Lewis base, and when plural "Y"s exist, "Y"s may be the same or different from each other and "Y"s each may be crosslinked to another Y, $E^1$, $E^2$, or X; $A_1$ and $A^2$ are each a divalent crosslinking group bonding two ligands and each represent a hydrocarbon group with 1 to 20 carbon atoms, a halogen-containing hydrocarbon group with 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$—, wherein $R^1$ represents a hydrogen atom, a halogen atom, a hydrocarbon group with 1 to 20 carbon atoms, or a halogen-containing hydrocarbon group with 1 to 20 carbon atoms, and $A^1$ and $A^2$ may be the same or different from each other. q represents an integer of 1 to 5, i.e., {(atomic valence of M)−2}; and r represents an integer of 0 to 3.

Specific examples of the transition metal compound represented by the general formula (i) include (1,2'-dimethylsilylene)(2,1'-dimethylsilylene)-bis(3-n-butylindenyl)zirconium dichloride, (1,2'-dimethylsilylene)(2,1'-dimethylsilylene)-bis(3-trimethylsilylmethylindenyl) zirconium dichloride, (1,2'-dimethylsilylene)(2,1'-dimethylsilylene)-bis(3-phenylindenyl)zirconium dichloride, (1,2'-dimethylsilylene)(2,1'-dimethylsilylene)-bis(4,5-benzoindenyl)zirconium dichloride, (1,2'-dimethylsilylene)(2,1'-dimethylsilylene)-bis(4-isopropylindenyl)zirconium dichloride, (1,2'-dimethylsilylene)(2,1'-dimethylsilylene)-bis(5,6-dimethylindenyl)zirconium dichloride, (1,2'-dimethylsilylene)(2,1'-dimethylsilylene)-bis(4,7-di-isopropylindenyl)zirconium dichloride, (1,2'-dimethylsilylene)(2,1'-dimethylsilylene)-bis(4-phenylindenyl)zirconium dichloride, (1,2'-dimethylsilylene)(2,1'- dimethylsilylene)-bis(3-methyl-4-isopropylindenyl) zirconium dichloride, (1,2'-dimethylsilylene)(2,1'-dimethylsilylene)-bis(5,6-benzoindenyl)zirconium dichloride, (1,2'-dimethylsilylene)(2,1'-isopropylidene)-bis(indenyl)zirconium dichloride, (1,2'-dimethylsilylene)(2,1'-isopropylidene)-bis(3-methylindenyl)zirconium dichloride, (1,2'-dimethylsilylene)(2,1'-isopropylidene)-bis(3-isopropylindenyl)zirconium dichloride, (1,2'-dimethylsilylene)(2,1'-isopropylidene)-bis(3-n-butylindenyl)zirconium dichloride, and (1,2'-dimethylsilylene)(2,1'-isopropylidene)-bis(3-trimethylsilylmethylindenyl) zirconium dichloride; and these compounds wherein the zirconium is substituted with titanium or hafnium.

The component (B-1) as the component (B) includes dimethyl anilinium tetrakis pentafluorophenyl borate, triethylammonium tetraphenyl borate, tri-n-butylammonium tetraphenyl borate, trimethylammonium tetraphenyl borate, tetraethylammonium tetraphenyl borate, methyl (tri-n-butyl) ammonium tetraphenyl borate, and benzyl (tri-n-butyl) ammonium tetraphenyl borate.

These components (B-1) may be used alone or in combination of two or more kinds. On the other hand, the aluminoxane as the component (B-2) includes methylaluminoxane, ethylaluminoxane, isobutylaluminoxane and the like. These aluminoxanes may be used alone or in combination of two or more kinds. Alternatively, one or more kinds of the components (B-2) may be used together with one or more kinds of the components (B-1).

As the above-mentioned polymerization catalyst, an organoaluminum compound can be used as the component (C) in addition to the above-mentioned components (A) and (B). The organoaluminum compound as the component (C) includes trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, ethylaluminum sesquichloride and the like. These organoaluminum compounds may be used alone or in combination of two or more kinds. In the polymerization of propylene, at least one kind of the catalytic components can be supported on a suitable carrier.

The polymerization process is not limited in particular, which may be conducted by slurry polymerization, gas phase polymerization, bulk polymerization, solution polymerization, suspension polymerization, or the like. However, bulk polymerization and solution polymerization are particularly preferable. The polymerization temperature is typically from −100° C. to 250° C. The use ratio of the catalyst to the reactive raw material "raw material monomer/component (A)" (mole ratio) is preferably from 1 to $10^8$, more preferably from 10 to $10^5$, further more preferably $10^2$ to $10^5$. The polymerization time is typically preferably from 5 minutes to 10 hours. The reaction pressure is typically preferably from normal pressure to 20 MPa (gauge pressure).

(2) Propylene-Based Polymer Having Elastic Modulus of 500 MPa or More

In the present invention, a propylene-based polymer having an elastic modulus of 500 MPa or more is used as the substrate resin. The propylene-based polymer is a propylene-based polymer having a high stereoregularity. Hereinafter "propylene-based polymer having an elastic modulus of 500 MPa or more" may be referred to as "high-crystalline propylene-based polymer".

A propylene-based polymer having an elastic modulus of less than 500 MPa has a low degree of crystallinity and the crystallization rate thereof is low, and therefore, the mechanical properties of the molded product to be produced by molding the resin composition are extremely poor. From the viewpoint of the mechanical properties of the polymer, the elastic modulus is preferably higher, but from the viewpoint of the producibility of molded products, the upper limit of the elastic modulus is preferably 3000 MPa. From these viewpoints, the elastic modulus of the high-crystalline propylene-based polymer (2) is 500 MPa or more, preferably 700 MPa or more, more preferably 1,000 MPa or more, further more preferably 1,200 MPa or more, still further more preferably 1,400 MPa or more, and is preferably 3,000 MPa or less, more preferably 2,000 MPa or less, even more preferably 1,800 MPa or less.

So far as the elastic modulus thereof is 500 MPa or more, the high-crystalline propylene-based polymer (2) may be a copolymer with any other α-olefin than propylene. As the α-olefin, there may be exemplified here the same ones as those described hereinabove for the low-crystalline olefin-based polymer (1). The high-crystalline propylene-based polymer (2) is preferably a propylene homopolymer, a propylene-ethylene random copolymer, a propylene-ethylene-1-butene random copolymer, or a propylene-ethylene block copolymer, and is more preferably a propylene homopolymer (polypropylene).

The melting point of the high-crystalline propylene-based polymer (2) for use in the present invention is preferably from 120 to 200° C., more preferably from 130 to 180° C., even more preferably from 150 to 175° C.

In addition, the melt flow rate (MFR) of the high-crystalline propylene-based polymer (2) for use in the present invention is preferably from 1 to 100 g/10 min, more preferably from 10 to 80 g/10 min, even more preferably from 15 to 80 g/10 min, still more preferably from 15 to 50 g/10 min.

The high-crystalline propylene-based polymer (2) for use in the present invention may be produced, for example, according to the method described in JP-A 2006-103147, etc.

(3) Additive

Not specifically defined, the additive (3) for use in the present invention may be any additive useful for bleed-out, for which employable here are any known conventional ones. As the additive, a liquid or a solid powder may be directly incorporated in the resin, but from the viewpoint of handleability, the meterability and dispersivity, it is desirable that the additive is added to a resin in the form of a master batch thereof.

Specific examples of the additive include a foaming agent, a crystal nucleating agent, a weather-resistant stabilizer, a UV stabilizer (UV absorbent), a light stabilizer, a heat stabilizer, an antistatic agent, an electrifying agent, a release agent, a flame retardant, a synthetic oil, a wax, an electric properties improver, a slip agent, an antiblocking agent, a viscosity regulator, a discoloration inhibitor, an antifogging agent, a lubricant, a pigment, a dye, a plasticizer, a softener, an antiaging agent, a hydrochloric acid absorbent, a chlorine trapping agent, an antioxidant, an anti-adhesive agent, etc. Above all, preferred is at least one selected from an antistatic agent, a release agent, an electric properties improver, a light stabilizer, a UV stability, a slip agent, an antiblocking agent, an antifogging agent and an anti-adhesive agent, and more preferred is an antistatic agent.

As the antistatic agent, usable here is any known antistatic agent. The antistatic agent includes, as examples thereof, an anionic surfactant, a cationic surfactant, a nonionic surfactant, an ampholytic surfactant, a mixture of the surfactants, etc. For example, there is mentioned stearic acid monoglyceride.

As the UV stabilizer, usable is any known UV stabilizer. The UV stabilizer includes benzotriazole-based, benzophenone-based, salicylate-based, cyanoacrylate-based, nickel-based and triazine-based ones. For example, there is mentioned benzotriazole.

As the slip agent, usable is any known slip agent. The slip agent includes higher fatty acid amides as examples thereof. For example, there is mentioned erucic acid amide.

(Constitution of Resin Composition)

The content of the low-crystalline olefin-based polymer (1) in the resin composition that constitutes the molded product of the present invention is from 1 to 30% by mass, preferably from 2 to 20% by mass, more preferably from 3 to 10% by mass. When the content of the low-crystalline-olefin-based polymer (1) is less than 1% by mass, then the effect on additive bleed-out is poor and unfavorable. When the content is more than 30% by mass, then it is also unfavorable since the physical properties of the resin composition is greatly deteriorated.

The content of the additive (3) in the resin composition that constitutes the molded product of the present invention is from 0.0001 to 2% by mass, preferably from 0.001 to 1% by mass, more preferably from 0.01 to 0.5% by mass. When the content of the additive (3) is less than 0.0001% by mass, then it is unfavorable since the additive-derived physical properties can be hardly exhibited. On the other hand, when the content is more than 2% by mass, it is also unfavorable since the mechanical properties of the molded product are noticeably worsened.

The resin composition to constitute the molded product of the present invention may contain any other thermoplastic resin besides the low-crystalline olefin-based polymer (1) and the high-crystalline-propylene-based polymer (2). The other thermoplastic resin includes, for example, ethylene-vinyl acetate copolymers, hydrogenated styrenic elastomers, polyester resins, polyamide resins, etc. One alone or a combination of two or more of these may be used.

In the case where the other thermoplastic resin is added to the resin composition, the content of the other thermoplastic resin in the resin composition is preferably 30% by mass or less, more preferably 20% by mass or less, even more preferably 10% by mass or less, still more preferably 5% by mass or less.

The content of the high-crystalline propylene-based polymer (2) in the resin composition that constitutes the molded product of the present invention is the "balance" to be calculated by subtracting the content of all the other constituent components from 100% by mass.

(Physical Properties of Resin Composition)

With respect to the polyolefin molded product of the present invention, the ratio of the following physical property (a) to the following physical property (b) ((a)/(b)) is from 0.75 to 1.35, preferably from 0.8 to 1.25, more preferably from 0.9 to 1.1.

(a) Additive-derived physical property of the molded product stored for 7 days just after the molding thereof in an environment at a temperature of 23° C. and a humidity of 50%.

(b) Additive-derived physical property of the molded product stored for 7 days just after the molding thereof in an environment at a temperature of 40° C. and a humidity of 90%.

The polyolefin molded product of the present invention has little environmental dependence of additive bleed-out. Accordingly, there is no need of consideration of any influence of bleed-out that may vary depending on the temperature and humidity environments where the molded product is used, and the formulation of additives in production of the molded article can be kept constant.

The type of the additives usable in the present invention, the additive-derived physical properties and the preferred range of the above-mentioned physical property ratio (a)/(b) are shown below.

TABLE 1

| Type of Additive | Additive-Derived Physical Properties | Unit of Physical Property | Ratio of (a)/(b) *1 |
|---|---|---|---|
| Antistatic Agent | Surface Resistivity | Ω | 0.75 to 1.35, preferably 0.8 to 1.25 *2 |
| Release Agent | Coefficient of Static Friction | — | 0.75 to 1.35, preferably 0.8 to 1.25 |
| Electric Properties Improver | Surface Resistivity | Ω | 0.75 to 1.35, preferably 0.8 to 1.25*2 |
| Light Stabilizer | Yellow Index | — | 0.75 to 1.35, preferably 0.8 to 1.25 |
| UV Absorbent | Yellow Index | — | 0.75 to 1.35, preferably 0.8 to 1.25 |
| Slip Agent | Coefficient of Static Friction | — | 0.75 to 1.35, preferably 0.8 to 1.25 |
| Antiblocking Agent | Blocking | N | 0.75 to 1.35, preferably 0.8 to 1.25 |
| Antifogging Agent | Haze, Gloss | % | 0.75 to 1.35, preferably 0.8 to 1.25 |
| Anti-adhesive Agent | Coefficient of Static Friction | — | 0.75 to 1.35, preferably 0.8 to 1.25 |

*1: (a) Additive-derived physical property of the molded product stored for 7 days just after the molding thereof in an environment at a temperature of 23° C. and a humidity of 50%. (b) Additive-derived physical property of the molded product stored for 7 days just after the molding thereof in an environment at a temperature of 40° C. and a humidity of 90%.
*2: Value converted into common logarithm.

With respect to the polyolefin molded product of the present invention, the ratio of the following physical property (a') to the following physical property (b') ((a')/(b')) is preferably from 0.75 to 1.35, more preferably from 0.8 to 1.25, even more preferably from 0.9 to 1.1.

(a') Additive-derived physical property of the molded product stored for 1 day just after the molding thereof in an environment at a temperature of 23° C. and a humidity of 50%.

(b') Additive-derived physical property of the molded product stored for 1 day just after the molding thereof in an environment at a temperature of 40° C. and a humidity of 90%.

The preferred range of the above-mentioned ratio (a')/(b') regarding the physical properties of the additive usable in the present invention is shown below.

TABLE 2

| Type of Additive | Additive-Derived Physical Properties | Unit of Physical Property | Ratio of (a')/(b') *1 |
|---|---|---|---|
| Antistatic Agent | Surface Resistivity | Ω | 0.75 to 1.35, preferably 0.8 to 1.25 *2 |
| Release Agent | Coefficient of Static Friction | — | 0.75 to 1.35, preferably 0.8 to 1.25 |

TABLE 2-continued

| Type of Additive | Additive-Derived Physical Properties | Unit of Physical Property | Ratio of (a')/(b') *1 |
|---|---|---|---|
| Electric Properties Improver | Surface Resistivity | Ω | 0.75 to 1.35, preferably 0.8 to 1.25*2 |
| Light Stabilizer | Yellow Index | — | 0.75 to 1.35, preferably 0.8 to 1.25 |
| UV Absorbent | Yellow Index | — | 0.75 to 1.35, preferably 0.8 to 1.25 |
| Slip Agent | Coefficient of Static Friction | — | 0.75 to 1.35, preferably 0.8 to 1.25 |
| Antiblocking Agent | Blocking | N | 0.75 to 1.35, preferably 0.8 to 1.25 |
| Antifogging Agent | Haze, Gloss | % | 0.75 to 1.35, preferably 0.8 to 1.25 |
| Anti-adhesive Agent | Coefficient of Static Friction | — | 0.75 to 1.35, preferably 0.8 to 1.25 |

*1: (a') Additive-derived physical property of the molded product stored for 1 day just after the molding thereof in an environment at a temperature of 23° C. and a humidity of 50%.
(b') Additive-derived physical property of the molded product stored for 1 day just after the molding thereof in an environment at a temperature of 40° C. and a humidity of 90%.
*2: Value converted into common logarithm.

In the present invention, it is desirable that the additive is an antistatic agent, and the additive-derived physical property is a surface resistivity. In particular, with respect to the molded product, especially the sheet or the film of the present invention, the dust-proofing effect due to addition of an antistatic agent thereto is remarkable. The surface resistivity is measured according to JIS K6911.

In general, a polyolefin resin composition is not polar and is readily electrified, and therefore dust easily adheres thereto. When an antistatic agent is added to the resin composition and molded into a sheet or a film, the antistatic agent may bleed out on the surface of the sheet or the film to exhibit the dust-proofing effect thereof. However, in general, the additive may readily bleed out at a high temperature and a high humidity, and therefore, depending on the temperature and humidity environments in which the sheet or the film is stored or used, the antistatic agent may too much bleed out to cause cloudiness or stickiness. Accordingly, heretofore, the amount of the antistatic agent to be added at the production of sheets or films is determined depending on the environments where they are to be put.

As opposed to this, the polyolefin molded product of the present invention has little environmental dependence of additive bleed-out. Accordingly, there is no need of consideration of fluctuation in the bleeding amount of the additive to be used, depending on the temperature and humidity environments where the molded product, especially a sheet or film, is used, and additive formulation can be kept constant.

Also preferably in the present invention, the additive is a slip agent and the additive-derived physical property is a coefficient of static friction. In particular, in the molded product of the present invention, especially in a sheet or a film thereof, the friction-reducing effect owing to addition of a slip agent thereto is remarkable. The coefficient of static friction is measured according to JIS K7125.

In general, a polyolefin resin composition is not polar, and therefore may readily have a high friction coefficient between the compositions having been brought into contact with each other owing to the intermolecular interaction. When a slip agent is added to the resin composition and molded into a sheet or a film, the slip agent may bleed out on the surface of the sheet or the film to exhibit the friction-reducing effect thereof. However, in general, the additive may readily bleed out at a high temperature and a high humidity, and therefore, depending on the temperature and humidity environments in which the sheet or the film is stored or used, the slip agent may too much bleed out to cause cloudiness or stickiness. Accordingly, heretofore, the amount of the slip agent to be added at the production of sheets or films is determined depending on the environments where they are to be put.

As opposed to this, the polyolefin molded product of the present invention has little environmental dependence of additive bleed-out. Accordingly, there is no need of consideration of fluctuation in the bleed-out amount of the additive to be used, depending on the temperature and humidity environments where the molded product, especially a sheet or film, is used, and additive formulation can be kept constant.

(Molded Product)

The polyolefin molded product of the present invention can be produced by molding the above-mentioned resin composition.

The molded product of the present invention includes films, sheets, containers, automobile interior materials, housing materials for electric household appliances, etc. The films include food packaging films, agricultural films (cases of plastic greenhouses), etc. The containers are excellent in transparency and include transparent cases, transparent boxes, presentation boxes, etc.

With respect to the molded product of the present invention, the surface area per unit gram is preferably from $1 \times 10^{-8}$ to 10 m$^2$/g, more preferably from $1 \times 10^{-7}$ to 5 m$^2$/g, even more preferably from $1 \times 10^{-6}$ to 1 m$^2$/g. With respect to the molded product having a surface area falling within the above-mentioned preferred range, the dust-proofing effect owing to addition of an antistatic agent thereto as well as the friction-reducing effect owing to addition of a slip agent thereto is remarkable.

For the molding method for the molded product, there are mentioned injection molding, compression molding, injection compression molding, gas-assisted injection molding, extrusion molding, blow molding, etc. The molding condition is not specifically defined so far as it is such a temperature condition that the resin composition can melt and flow, and in general, the molding can be performed at a resin composition temperature of from 50 to 300° C. and a mold temperature of 60° C. or lower.

In the case where a film or a sheet is formed as the molded product of the present invention, employable here is any ordinary compression molding, extrusion molding, blow molding, casting molding or the like. The film or the sheet may be stretched or may not be stretched. For stretching, if any, biaxial stretching is preferred. As the biaxial stretching condition, for example, there are mentioned the following conditions, which, however, are not limitative.

<Molding Conditions in Forming Films or Sheets>
 Resin temperature: 50 to 200° C.
 Chill roll temperature: 50° C. or lower
(Longitudinal Stretching Condition)
 Stretching draw ratio: 3 to 7 times
 Stretching temperature: 50 to 170° C.
(Lateral Stretching Condition)
 Stretching draw ratio: 6 to 12 times
 Stretching temperature: 50 to 170° C.

If desired, the film or the sheet may be surface-treated so as to increase the surface energy of the film or the sheet, or to impart polarity to the surface thereof. For example, the treatment method includes corona discharge treatment, chromate treatment, flame treatment, hot air treatment, ozone or UV irradiation treatment, etc. As the surface roughening method, for example, there are mentioned a sand blasting method, a solvent treatment method, etc.

EXAMPLES

The present invention will be more specifically explained with reference to Examples below but is not limited thereto in any way.

Production Example 1

Production of Low-Crystalline Polypropylene

In a stainless reactor equipped with a stirrer and having an internal volume of 20 L, n-heptane in an amount of 20 L/h, triisobutylaluminium in an amount of 15 mmol/h, and a catalyst component that had been previously prepared by bringing dimethylanilinium tetrakispentafluorophenylborate, (1,2'-dimethylsilylene) (2,1'-dimethylsilylene)-bis(3-trimethylsilylmethylindenyl)zirconium dichloride, triisobutylaluminium, and propylene into contact with each other in a mass ratio of 1:2:20, in a zirconium-equivalent amount of 6 μmol/h were continuously fed.

The mixture was polymerized at a polymerization temperature set at 55° C. by continuously feeding propylene and hydrogen thereinto so as to maintain a hydrogen concentration of 8% by mol in the gas phase of the reactor and a total pressure of 1.0 MPa in the reactor (gauge pressure).

To the resultant polymerization solution, "Irganox 1010" (trade name, available from BASF Ltd.) as a stabilizer was added so that the content ratio thereof could be 1000 ppm by mass. Subsequently, n-heptane as a solvent was removed to give a low-crystalline polypropylene.

The low-crystalline polypropylene produced in Production Example 1 was assayed as follows. The measurement results are shown in Table 3.

[Measurement of Elastic Modulus]

The low-crystalline polypropylene produced in Production Example 1 was formed into a press sheet having a thickness of 1 mm. A test piece according to JIS K7113 (2002)-No. 2, ½, was sampled from the resultant press sheet. Using a tensile tester (available from Shimadzu Corporation, trade name: Autograph AG-I), the initial length L0 was set to be 40 mm, and the sample was stretched at a pulling rate of 100 mm/min, and in the stretching process, the strain and the load were measured. The initial elastic modulus was calculated from the following formula.

Initial Elastic Modulus($N$)=load at 5% strain($N$)/0.05

[Measurement of Melting Point]

Using a differential scanning calorimeter (DSC-7 available from PerkinElmer, Inc.), 10 mg of a sample was kept in a nitrogen atmosphere at −10° C. for 5 minutes, and then heated at 10° C./min. The peak top of the peak appearing on the highest temperature side of the resultant melt endotherm curve was referred to as the melting point (Tm–D).

[Evaluation of Stereoregularity: NMR Measurement]

The $^{13}$C-NMR spectrum was measured with the following device under the following conditions. The peak assignment followed the method proposed by A. Zambelli, et al., "Macromolecules, 8, 687 (1975)".

Device: $^{13}$C-NMR spectrometer, JNM-EX400 series available from JEOL, Ltd.
  Method: proton complete decoupling
  Concentration: 220 mg/mL
  Solvent: mixed solvent of 1,2,4-trichlorobenzene and deuterated benzene in 90:10 (volume ratio)
  Temperature: 130° C.
  Pulse width: 45°
  Pulse repetition time: 4 seconds
  Accumulation: 10,000 times <Calculating Expressions>
  M=m/S×100
  R=γ/S×100
  S=Pββ+Pαβ+Pαγ
  S: Signal intensity of carbon atoms in side chain methyl of all propylene units
  Pββ: 19.8 to 22.5 ppm
  Pαβ: 18.0 to 17.5 ppm
  Pαγ: 17.5 to 17.1 ppm
  γ: racemic pentad chain, 20.7 to 20.3 ppm
  m: meso-pentad chain, 21.7 to 22.5 ppm The meso-pentad fraction [mmmm], the racemic-pentad fraction [rrrr] and the racemic-meso-racemic-meso-pentad fraction [rmrm] were measured in accordance with the method proposed by A. Zambelli, et al., "Macromolecules, 6, 925 (1973)", and are the meso fraction, the racemic fraction and the racemic-meso-racemic-meso fraction in the pentad units in the polypropylene molecular chain measured by the signals of the methyl group in the $^{13}$C-NMR spectrum. As the meso-pentad fraction [mmmm] increases, the stereoregularity increases. The triad-fractions [mm], [rr], and [mr] were also calculated by the above-mentioned method.

[Measurement of Weight-Average Molecular Weight (Mw) and Molecular Weight Distribution (Mw/Mn)]

The weight-average molecular weight (Mw) and the molecular weight distribution (Mw/Mn) were determined by gel permeation chromatography (GPC). The following device and conditions were used in this measurement to give the polystyrene-equivalent weight-average molecular weight of the analyzed sample.

<GPC Device>
  Column: TOSO GMHHR-H(S)HT
  Detector: RI detector for liquid chromatography, Waters 150C <Measurement Conditions>
  Solvent: 1,2,4-trichlorobenzene
  Measurement temperature: 145° C.
  Flow rate: 1.0 mL/minute
  Sample concentration: 2.2 mg/mL
  Injection amount: 160 μL
  Calibration curve: Universal Calibration
  Analysis software: HT-GPC (ver. 1.0)

[Measurement of Melt Flow Rate (MFR)]

MFR was measured at a temperature of 230° C. under a weight of 21.18 N in accordance with JIS K7210.

TABLE 3

|  | Production Example 1 Low-Crystalline Polypropylene A |
|---|---|
| Initial Elastic Modulus (MPa) | 45 |
| Melting Point (Tm-D) (° C.) | 75 |
| [mmmm] (mol %) | 48 |
| [rrrr]/(1 − [mmmm]) | 0.038 |
| [rmrm] (mol %) | 2.9 |

TABLE 3-continued

|  | Production Example 1<br>Low-Crystalline<br>Polypropylene A |
|---|---|
| [mm] × [rr]/[mr]$^2$ | 1.6 |
| Weight-Average Molecular Weight (Mw) | 140000 |
| Molecular Weight Distribution (Mw/Mn) | 2.0 |
| MFR (g/10 min) | 46 |

Example 1

[Production of Resin Composition]

5% by mass of the low-crystalline polypropylene produced in Production Example 1, 94% by mass of high-crystalline polypropylene (PP, trade name: F-704NP available from Prime Polymer Co., Ltd.), and 1% by mass of an antistatic agent master batch comprising 8% by mass of stearic acid monoglyceride was melted and kneaded in the blend ratio to give a resin composition. In the same manner as above, the initial elastic modulus of the high-crystalline polypropylene was calculated and was 1600 MPa.

[Production of Sheet]

The resultant resin composition was formed into a sheet having a thickness of 400 μM, using a 50-mmφ T-die cast-molding machine (available from Thermo Plastics Industrial Co., Ltd.) under the following molding conditions.

T-die outlet temperature: 230° C.

Chill roll: pearskin finish

Chill roll temperature: 30° C.

Take-up speed: 1.2 m/min

[Evaluation of Sheet]

For quality evaluation, the sheet was, after produced, aged in an environment at a temperature of 23° C. and a humidity of 50% or at a temperature of 40° C. and a humidity of 90%, for 1 day or 7 days, then conditioned at a temperature of 23° C. and a humidity of 50% for 1 hour or more, and thereafter under the same temperature and humidity condition, the surface resistivity of the sheet was measured. The surface resistivity was measured according to JIS K6911. The value of the surface resistivity was converted into common logarithm. A smaller surface resistivity means that the additive bleed-out amount is larger. The results are shown in Table 4.

Example 2

A resin composition was produced in the same manner as in Example 1, except that the resin blend ratio in Example 1 was changed to such that the amount of the low-crystalline polypropylene was 10% by mass and the amount of the high-crystalline polypropylene was 89% by mass. Also in the same manner as in Example 1 except that the resultant resin composition was used, a sheet was produced and evaluated.

Example 3

A resin composition was produced in the same manner as in Example 1, except that the resin blend ratio in Example 1 was changed to such that the amount of the low-crystalline polypropylene was 3% by mass and the amount of the high-crystalline polypropylene was 96% by mass. Also in the same manner as in Example 1 except that the resultant resin composition was used, a sheet was produced and evaluated.

Comparative Example 1

A resin composition was produced in the same manner as in Example 1, except that the low-crystalline polypropylene was not incorporated and the amount of the high-crystalline polypropylene was changed to 99% by mass. Also in the same manner as in Example 1 except that the resultant resin composition was used, a sheet was produced and evaluated.

TABLE 4

|  |  |  |  | Example | | | Comparative<br>Example |
|---|---|---|---|---|---|---|---|
|  |  |  |  | 1 | 2 | 3 | 1 |
| Starting | High-Crystalline Polypropylene | | | 94 | 89 | 96 | 99 |
| Materials | Low-Crystalline Polypropylene: Production Example 1 | | | 5 | 10 | 3 | 0 |
| [mass %] | Antistatic Agent Master Batch (8 Mass %) | | | 1 | 1 | 1 | 1 |
|  | (Content of Antistatic Agent) | | | 0.0008 | 0.0008 | 0.0008 | 0.0008 |
| Resin | Elastic Modulus of High-Crystalline Polypropylene [MPa] | | | 1600 | 1600 | 1600 | 1600 |
| Properties | Elastic Modulus of Low-Crystalline Polypropylene [MPa] | | | 45 | 45 | 45 | — |
| Surface | Aging | one day | Temperature/Humidity 23° C., 50% | 13.83 | 14.76 | 14.36 | 16.00 |
| Resistivity | Period | | during Storage 40° C., 90% | 14.30 | 14.38 | 14.49 | 11.60 |
| [Ω] *3 | | | Ratio of (23° C., 50%) to (40° C., 90%) | 0.97 | 1.03 | 0.99 | 1.38 |
|  |  | 7 days | Temperature/Humidity 23° C., 50% | 13.70 | 15.36 | 14.08 | 16.00 |
|  |  |  | during Storage 40° C., 90% | 14.26 | 14.67 | 12.95 | 11.36 |
|  |  |  | Ratio of (23° C., 50%) to (40° C., 90%) | 0.96 | 1.05 | 1.09 | 1.41 |

*3: Value converted into common logarithm.

In Comparative Example 1, the surface resistivity greatly varied in different storage environments, from which it can be seen that the bleed-out amount of the antistatic agent greatly varied.

As opposed to this, in Examples 1 to 3, the fluctuation in the surface resistivity was small even in different storage environments, from which it can be seen that the environmental dependence of bleed-out is small.

Example 4

A resin composition was produced in the same manner as in Example 2, except that a slip agent master batch containing 10% by mass of erucic acid amide was used in place of the antistatic master batch. Also in the same manner as in Example 2 except that the resultant resin composition was used, a sheet was produced.

Comparative Example 2

A resin composition was produced in the same manner as in Comparative Example 1, except that a slip agent master batch containing 10% by mass of erucic acid amide was used in place of the antistatic master batch. Also in the same manner as in Comparative Example 1 except that the resultant resin composition was used, a sheet was produced.

[Evaluation of Sheet]

For quality evaluation, the sheets of Example 4 and Comparative Example 2 were, after produced, aged in an environment at a temperature of 23° C. and a humidity of 50% or at a temperature of 40° C. and a humidity of 90%, for 1 day or 7 days, then conditioned at a temperature of 23° C. and a humidity of 50% for 1 hour or more, and thereafter under the same temperature and humidity condition, the coefficient of static friction of each sheet was measured. The coefficient of static friction was measured according to JIS K7125. A smaller coefficient of static friction means that the additive bleed-out amount is larger. The results are shown in Table 5.

TABLE 5

| | | | | Example 4 | Comparative Example 2 |
|---|---|---|---|---|---|
| Starting Materials [mass %] | High-Crystalline Polypropylene | | | 89 | 99 |
| | Low-Crystalline Polypropylene: Production Example 1 | | | 10 | 0 |
| | Slip Agent Mater Batch (10 mass %) | | | 1 | 1 |
| | (Content of Slip Agent) | | | 0.001 | 0.001 |
| Resin Properties | Elastic Modulus of High-Crystalline Polypropylene [MPa] | | | 1600 | 1600 |
| | Elastic Modulus of Low-Crystalline Polypropylene [MPa] | | | 45 | — |
| Coefficient of Static Friction [—] | Aging Period | 1 day | Temperature/Humidity 23° C., 50% | 0.17 | 0.19 |
| | | | during Storage 40° C., 90% | 0.13 | 0.10 |
| | | | Ratio of (23° C., 50%) to (40° C., 90%) | 1.33 | 1.91 |
| | | 7 days | Temperature/Humidity 23° C., 50% | 0.15 | 0.18 |
| | | | during Storage 40° C., 90% | 0.14 | 0.10 |
| | | | Ratio of (23° C., 50%) to (40° C., 90%) | 1.10 | 1.75 |

In Comparative Example 2, the coefficient of static friction greatly varied in different storage environments, from which it can be seen known that the bleed-out amount of the slip agent greatly varied.

As opposed to this, in Example 4, the fluctuation in the coefficient of static friction was small even in different storage environments, from which it can be seen that the environmental dependence of bleed-out is small.

INDUSTRIAL APPLICABILITY

The molded product of the present invention has little environmental dependence of additive bleed-out, and is especially useful for sheets, films, etc.

The invention claimed is:

1. A polyolefin molded product, comprising:
  a resin composition comprising:
    (1) from 1 to 30% by mass of an olefin-based polymer obtained by polymerizing propylene along and having an elastic modulus of from 5 to 450 MPa,
    (2) a propylene-based polymer having an elastic modulus of 500 MPa or more, and
    (3) from 0.0001 to 2% by mass of an additive.
  a balance of the content of the polyolefin molded product in mass % is the propylene-based polymer,
  a surface area per unit gram of the polyolefin molded products is from $1 \times 10^{-8}$ to $1$ m$^2$/g, and
  a ratio of an additive-derived physical property value (a) of the polyolefin molded product to an additive-derived physical property value (b) of the polyolefin molded product ((a)/(b)) is from 0.9 to 1.1
  wherein (a) the additive-derived physical property value (a) of the polyolefin molded products is measured after the polyolefin molded product is stored for 7 days just after molding thereof in an environment at a temperature of 23° C. and a humidity of 50%, and
  wherein (b) the additive-derived physical property value (b) of the polyolefin molded product is measured after the polyolefin molded product is stored for 7 days just after molding thereof in an environment at a temperature of 40° C. and a humidity of 90%,
  wherein the additive and the additive-derived physical property values (a) and (b) are pairs of additive and additive-derived physical property values selected from the group of pairs (i)-(x):
    (i) an antistatic agent and surface resistivity,
    (ii) a release agent and coefficient of static friction,
    (iii) an electric property improver and surface resistivity,
    (iv) a light stabilizer and yellow index,
    (v) a UV absorbent and yellow index,
    (vi) a slip agent and coefficient of static friction,
    (vii) an antiblocking agent and blocking,
    (viii) an antifogging agent and haze,
    (ix) an antifogging agent and gloss, and
    (x) an anti-adhesive agent and coefficient of static friction.

2. The polyolefin molded product according to claim 1, wherein the additive is an antistatic agent and the additive-derived physical property value (a) and the additive-derived physical property value (b) are a surface resistivity.

3. The polyolefin molded product according to claim 1, wherein the olefin-based polymer (1) satisfies characteristics (a) to (g):
  (a) [mmmm]=20 to 60 mol %,
  (b) [rrrr]/(1−[mmmm])≤0.1,
  (c) [rmrm]>2.5 mol %,
  (d) [mm]×[rr]/[mr]$^2$≤2.0,
  (e) weight-average molecular weight (Mw)=10,000 to 500,000,
  (f) molecular weight distribution (Mw/Mn)<4, and
  (g) a melting point (Tm−D), defined as a peak top of a peak appearing on the highest temperature side of a melt endothermic curve drawn by keeping a polymer in a nitrogen atmosphere at −10° C. for 5 minutes and then heating it at 10° C./min, using a differential scanning calorimeter (DSC), is from 0 to 120° C.

4. The polyolefin molded product according to claim 1, wherein the additive and the additive-derived physical property values (a) and (b) are pairs selected from the group of pairs:
  an antistatic agent and surface resistivity, and
  a slip agent and coefficient of static friction.

5. The polyolefin molded product according to claim 1, wherein the polyolefin molded product is a sheet or a film.

6. The polyolefin molded product according to claim 1, formed by injection molding, compression molding, injection compression molding, gas-assisted injection molding, extrusion molding, or blow molding.

7. A polyolefin molded product selected from the group consisting of an injection molded product, a compression molded product, an injection compression molded product, a gas-assisted injection molded product, an extrusion molded product, and a blow molded product, comprising:
   a resin composition comprising:
      (1) from 1 to 10% by mass of an olefin-based polymer having an elastic modulus of from 5 to 450 MPa,
      (2) a propylene-based polymer having an elastic modulus of 500 MPa or more, and
      (3) from 0.0001 to 2% by mass of an additive,
   a balance of the content of the polyolefin molded product in mass % is the propylene-based polymer,
   a ratio of an additive-derived physical property value (a) of the polyolefin molded product to an additive-derived physical property value (b) of the polyolefin molded product ((a)/(b)) is from 0.9 to 1.1
      wherein (a) the additive-derived physical property value (a) of the polyolefin molded product is measured after the polyolefin molded product is stored for 7 days just after molding thereof in an environment at a temperature of 23° C. and a humidity of 50%, and
      wherein (b) the additive-derived physical property value (b) of the polyolefin molded product is measured after the polyolefin molded product is stored for 7 days just after molding thereof in an environment at a temperature of 40° C. and a humidity of 90%,
   wherein the additive and the additive-derived physical property values (a) and (b) are pairs of additive and additive-derived physical property values selected from the group of pairs (i)-(x):
      (i) an antistatic agent and surface resistivity,
      (ii) a release agent and coefficient of static friction,
      (iii) an electric property improver and surface resistivity,
      (iv) a light stabilizer and yellow index,
      (v) a UV absorbent and yellow index,
      (vi) a slip agent and coefficient of static friction,
      (vii) an antiblocking agent and blocking,
      (viii) an antifogging agent and haze,
      (ix) an antifogging agent and gloss, and
      (x) and anti-adhesive agent and coefficient of static friction.

8. The polyolefin molded product according to claim 7, wherein the additive and the additive-derived physical property values (a) and (b) are pairs selected from the group of pairs:
   an antistatic agent and surface resistivity, and
   a slip agent and coefficient of static friction.

* * * * *